(12) United States Patent
Vanderhye

(10) Patent No.: US 8,051,802 B2
(45) Date of Patent: Nov. 8, 2011

(54) FODDER TREE UTILIZATION IN PASTURE BASED MONOGASTRIC DIGESTION ANIMAL MANAGEMENT

(76) Inventor: Keith G. Vanderhye, Ithaca, NY (US)

(*) Notice: Subject to any disclaimer, the term of this patent is extended or adjusted under 35 U.S.C. 154(b) by 1855 days.

(21) Appl. No.: 10/970,991

(22) Filed: Oct. 25, 2004

(65) Prior Publication Data
US 2005/0132965 A1  Jun. 23, 2005

Related U.S. Application Data

(60) Provisional application No. 60/531,603, filed on Dec. 23, 2003.

(51) Int. Cl.
*A01K 3/00* (2006.01)
*A01K 5/00* (2006.01)
(52) U.S. Cl. .................................... 119/51.01
(58) Field of Classification Search .............. 119/51.01, 119/57.91, 446; 449/2; 47/1.01 R
See application file for complete search history.

(56) References Cited

U.S. PATENT DOCUMENTS

| | | | | |
|---|---|---|---|---|
| 533,476 | A * | 2/1895 | Lipscomb | 119/827 |
| 1,587,379 | A * | 6/1926 | Hallum | 119/782 |
| 2,972,334 | A * | 2/1961 | Braden | 119/51.01 |
| 3,663,199 | A * | 5/1972 | Cooper | 504/167 |
| 5,195,924 | A * | 3/1993 | Gagliardi, Jr. | 452/149 |
| 5,572,954 | A * | 11/1996 | Elkins | 119/502 |
| 5,665,409 | A * | 9/1997 | Drewry | 426/132 |
| 5,975,020 | A * | 11/1999 | Caveny et al. | 119/174 |
| 6,561,133 | B2 * | 5/2003 | Robbins | 119/174 |
| 6,653,971 | B1 * | 11/2003 | Guice et al. | 342/54 |

OTHER PUBLICATIONS

Philippines Council for Agriculture Agroforestry Report, 2003, sections 7-8, from http://www.pcarrd.dost.gov.ph/cin/AFIN/afin%20FAQ's.htm.
Kennedy, D. W., "What is Pasture Based Swine Management"; www.clt.astate.edu/dkennedy/pbsm.htm; 1998.
Gunthorp et al; "Pastured Pigs on the Gunthorp Farm"; grassfarmer.com; admitted prior art retrieved from internet Sep. 25, 2003.
Gunthorp, Greg; High Value Pork and Poultry Production and Marketing; Future Farms, 2002.
Iowa State University; "Swine System Options for Iowa"; May 1996.
Wheaton et al; "Forages for Swine"G2360, 1999, University of Missouri.
D'Mello, J.P.F.; "Nutritional potentialities of fodder trees . . . in monogastric nutrition"; www.fao.org/DOCREP003; admitted prior art Sep. 22, 2003.
Sharrow et al; "Trees and Pastures: 40 Years of Agrosilvopastoral . . . " Agroforestry and Sustainable Symposium Proceedings; Aug. 1994.

(Continued)

*Primary Examiner* — David Parsley

(57) ABSTRACT

Monogastric digestion animals, such as pigs and chickens, are raised in a completely environmentally sound and effective manner that has numerous other advantages over conventional feed lot confinement. The animals are allowed to roam and feed freely in a confined and managed at least one acre fodder tree orchard with pasture base (20-40% swine-compatible legumes, 80-55% grasses). The fodder trees are at least primarily honey locust, mulberry, chestnut, and persimmon, about 30-45 mature trees per acre. Swine may first be raised on primarily pasture alone, and the pasture base from the orchard harvested to produce hay, which is removed for use at a later time and/or place. A hog may be raised having a weight of about 250-340 pounds, and a lean weight of at least about 38%, and at least 5% leaner and heavier on average than if raised in feed lot confinement.

19 Claims, 2 Drawing Sheets

OTHER PUBLICATIONS

Gold, Michael A; "Gleditsia triacanthos—honeylocust, widely adapted temperature zone fodder tree"; FACT Net, FACT Apr. 1997; Jun. 1997.

"Food Production Alternatives . . . "; p. 14; www.afma.co.za/Mini_Web_AFMA/Images/20010402154941paper4.htm; 2001.

* cited by examiner

FODDER TREE UTILIZATION IN PASTURE BASED MONOGASTRIC DIGESTION ANIMAL MANAGEMENT

CROSS REFERENCE TO RELATED APPLICATION

This application is based upon U.S. Provisional Application 60/531,603 filed Dec. 23, 2003, which is incorporated by reference herein.

BACKGROUND AND SUMMARY OF THE INVENTION

The invention relates to raising monogastric digestion animals—such as pigs, chickens, and turkeys, but particularly suitable and advantageous for raising pigs—in a cost effective, humane, and environmentally sound manner.

When pigs were first used for food by humans, they typically were allowed to roam freely in forests, much as they did before they were domesticated. However as alternative uses for land became more common, and when the need for higher yields of meat became important as human populations increased, farmers moved increasingly restricted confinement of the pigs. At present, in the United States particularly, most hogs are now raised with a high level of confinement (feed lots), which results in unhealthy living conditions, erosion, pollution, a high cost of feed vs. return on production, and limited marketability.

There are a significant number of hogs that are now raised primarily on pasture land. This overcomes a number of the problems discussed above, but still requires that the animals be fed a significant amount of grain—such as corn—and requires a significant amount of land. There also are proposals for feeding hogs fruit from fodder trees, by harvesting the fruit and bringing it to the hogs in a confined area, but such proposals have not been particularly successful.

According to the present invention, an optimized method is provided for raising monogastric digestion animals, and perhaps best suited for raising hogs for market. The invention has all of the advantages that pasture raising has over confinement techniques (e.g. feedlots), and additionally minimizes the amount of additional feed and land area that need be used to grow hogs of a particular size. The invention uses about half the grain of feed lot systems for growing hogs of marketable size, typically grows hogs with more lean meat than feed lots, has lower production, break-even, and start-up costs, results in happier animals and farmers, renovates pasture land, results in excellent erosion control, mitigates environmental extremes, optimizes space utilization (including being able to use land that might otherwise be non-productive), and is simply environmentally superior to feed lots, or most other techniques. While there are some potential drawbacks, such as additional labor requirements, the animals may be slower to reach market weight, non-conventional breeds may be optimal, etc., they are typically enormously overshadowed by the advantages.

According to one of the most basic aspects of the present invention, there is provided a method of raising animals with monogastric digestion, comprising a) feeding the animals with monogastric digestion in a confined and managed fodder tree orchard with pasture base. Preferably a) is practiced with a pasture base that comprises about 20-40% swine-compatible legumes and about 85-55% grasses. The legumes are preferably selected from alfalfa, ladino clover, lespedeza clover, and combinations thereof, and the grasses are preferably selected from small grain cereals including barley, oats, and winter wheat, orchard grass, endophyte-free fescue, timothy, brome grass, sorghum sudangrass hybrid, and combinations thereof, although many other types of legumes or grasses may be utilized. Also, a) may be further practiced by strip seeding the pasture base with brassicas, rape, chicory, Jerusalem artichoke, or combinations thereof, as well as other plants that are particularly nutritious for hogs, turkeys, or the like.

The preferred fodder trees used in the practice of a) include primarily honey locust, mulberry, chestnut, persimmon, and combinations thereof, although other types of trees may be dispersed in the orchard, such as apple or pear trees. Procedure a) is preferably practiced using about 30-45 (e.g. about 35) mature (e.g. about 8-80 years old) fodder trees per acre of the orchard. When a) is practiced using at least primarily dioecious trees (such as honey locust) in the orchard, instead of providing male trees in the orchard, the method may be facilitated by grafting male branches on female trees at sufficient intervals to properly pollinate the female trees. Also, a) may be practiced using honey locust trees of a type which can produce about 40% sugar in the fruit pulp. The fooder trees may be produced from clones, or by planting about 120-180 seedling per acre and then thinning them as the grow depending upon location and health and fruit production of the seedlings.

In the method a) is most preferably practiced on old pasture land, hillsides, or other land not well suited for row crops but suitable for fodder tree and pasture growth.

Particularly when the animals are pigs, the method may further comprise: b) shortly prior to a) raising the pigs on primarily pasture alone. In order to prevent the orchard land from being trampled too much, with possible damage to the trees, in the wettest weather (typically the spring), the pigs are first raised on substantially pasture alone. At this time the pasture plants, including grasses, grow almost twice as quickly as later in the year, and the grass roots hold the soil well, particularly if there is at least about 60% grasses (or plants with like soil holding and hog feed-compatible properties). The pasture land used in b) may have approximately the same composition and types of plants as described above with respect to the orchard pasture base, except that the pasture plants used in the practice of a) should likely be slightly more shade tolerant, even though the orchard tree type and density is not such as to significantly adversely affect the growth of most desirable grasses and legumes.

The method also preferably further comprises c) harvesting the pasture base from the fodder tree orchard primarily prior to a) to produce hay, and removing at least the majority of the hay from the orchard for use at a later time and/or place (such as silage for sows during the winter time). With about 35 trees per acre, substantially uniformly spaced in a grid, they will be located about 36 feet apart. This allows four passes of a conventional eight foot mower bar during harvesting of the pasture plants, making harvesting simple and easy, and insuring no damage to the trees.

Preferably a)-c) are practiced in temperature zones 5-8 from about April to about November.

In the practice of the method, it is most desirable if substantially each pig is fed about 1-2 pounds of grain (one pound for feeder pigs, two pounds for sows) per day, and also conventional vitamin and/or mineral supplements, during the practice of a) and b). Typically, a) is practiced with about 15-25 feeder hogs per acre.

In the method a) is typically practiced at least in part by providing an electric fence around an orchard of at least one acre, although natural barriers, such as cliffs and deep ravines, can provide part of the confinement. Orchards about 10-20 acres is size would likely be ideal. In the orchards, water sources can be provided for the pigs in the form of conventional nipples, or troughs surrounded by concrete to minimize damage caused by wallowing.

The method further comprises butchering the pigs after a) when the pigs have reached a desired weight and lean content. When practicing the method of the invention, the weight and lean content may each be at least 5% greater on average than if the pigs were grown in feed lots. The pigs raised according to the invention may have a weight of about 250-340 pounds, and a lean weight of at least about 38%. While a number of different breeds of pigs may be utilized, breeds with particularly desirable qualities for use in the present invention include Tansworth, Old Spot, and Kune Kune.

The method may further comprise locating the fodder tree orchard substantially immediately above a row crop area so that any excess manure from the orchard will be carried (by natural drainage) to fertilize of the row crop area.

Normally, especially if care is taken in selecting the fodder trees to be utilized, the fruit from the trees will fall on the pasture base of the orchard with sufficient regularity to achieve the desired feeding of the animals being raised. However, if the fall of fruit is retarded, the method may further comprise facilitating timely release of fruit from the fodder trees by spraying plant hormone—such as gibberellin—on the trees, and/or mechanically shaking the trees.

The invention also comprises a pig having a weight of about 250-340 pounds, and a lean weight of at least about 38%, and raised by practicing the method described above.

Still further, the invention relates to an orchard on old pasture land, hillsides, or other land not well suited for row crops but suitable for fodder tree and pasture growth, the orchard having approximately 30-45 mature fodder trees per acre and a pasture base. The pasture base typically comprises about 20-40% monogastric animal-compatible legumes and about 85-55% grasses, of the types described above, and the fodder trees preferably are also primarily as described above. The orchard may be substantially immediately above a row crop area so that any excess manure from the orchard will be carried to fertilize the row crop area. While the orchard can be adapted to many climate and temperature zones, the orchard is most advantageous when located in temperature zones 5-8, inclusive.

It is the primary object of the present invention to provide for the advantageous raising of animals with monogastric digestion, particularly in an environmentally friendly and responsible manner. This and other objects of the invention will become clear from the detailed description of the invention, and the appended claims.

DETAILED DESCRIPTION OF THE DRAWINGS

Figure 1:
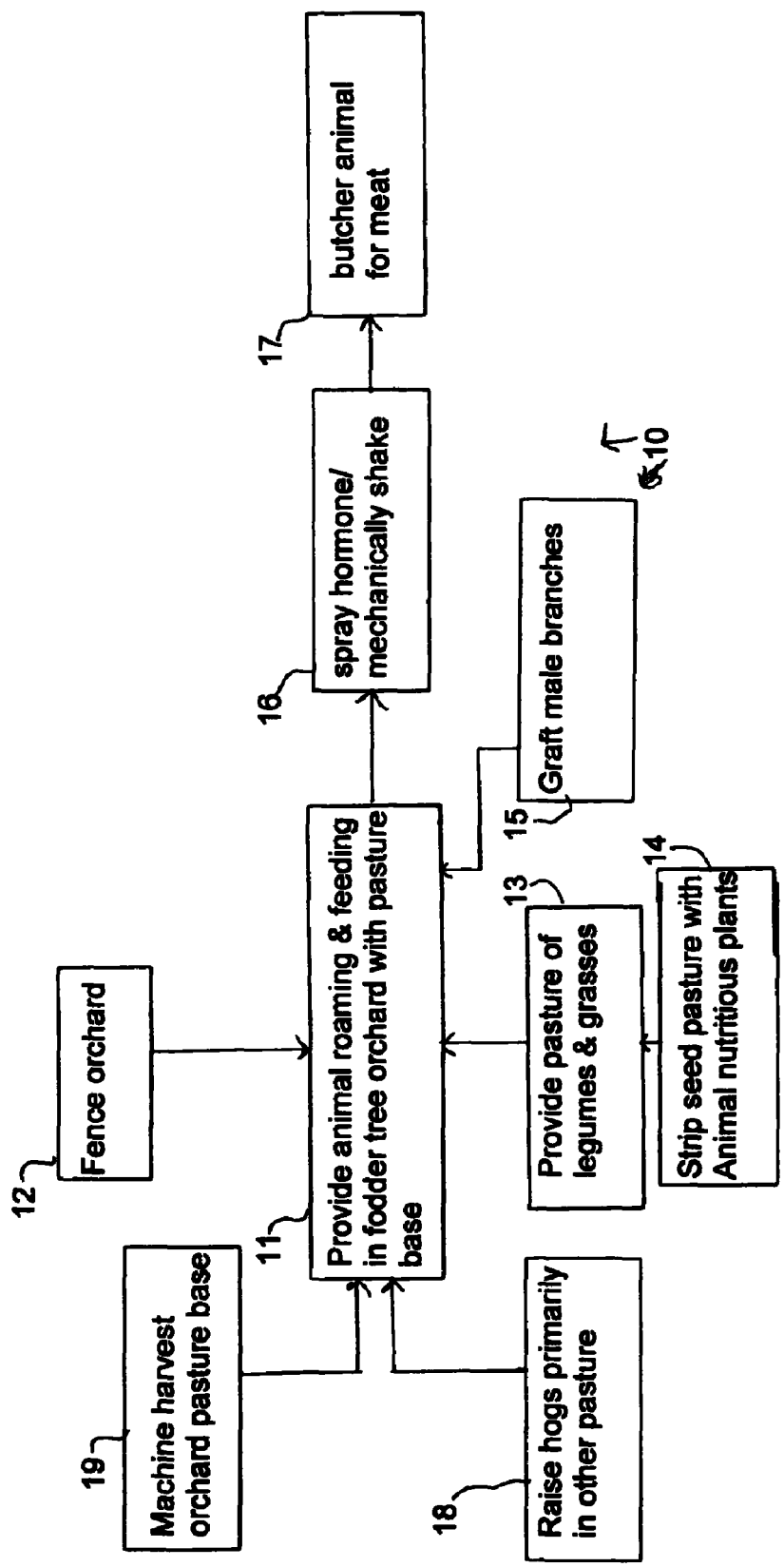
FIG. 1 is a box diagram of an exemplary method for raising monogastric digestion animals according to the present invention.

FIG. 1 schematically illustrates an exemplary method, shown generally at 10, of raising animals with monogastric digestion, such as hogs, chickens, or turkeys, in an environmentally sound manner according to the present invention. The most basic feature of the method, illustrated by box 11, is a) to provide animal roaming [particularly distinct from feed lot close confinement] and feeding in a confined and managed fodder tree orchard with pasture base. As indicated by box 12, typically the pasture (which preferably is at least about one acre and optimally about 10-20 acres), is confined by using fencing (e.g. electric fencing) although natural topography, such as cliffs or steep ravines, may also be used.

As indicated by box 13, preferably a) is practiced with a pasture base that comprises about 20-40% swine-compatible legumes and about 85-55% grasses. The legumes are preferably selected from alfalfa, ladino clover, lespedeza clover, and combinations thereof, and the grasses are preferably selected from small grain cereals including barley, oats, and winter wheat, orchard grass, endophyte-free fescue, timothy, brome grass, sorghum sudangrass hybrid, and combinations thereof, although many other types of legumes or grasses may be utilized. Also, a) may be further practiced, as indicated by box 14, by strip seeding the pasture base with brassicas, rape, chicory, Jerusalem artichoke, or combinations thereof, as well as other plants that are particularly nutritious for hogs, turkeys, or the like.

The fodder trees used in the practice of a) preferably include at least primarily (that is more than 50%), if not substantially exclusively, honey locust, mulberry, chestnut, persimmon, and combinations thereof, although other types of trees may be dispersed in the orchard, such as apple or pear trees. Procedure a) is preferably practiced using about 30-45 (e.g. about 35) mature (e.g. about 8-80 years old) fodder trees per acre of the orchard. When a) is practiced using primarily dioecious trees (such as honey locust) in the orchard, instead of providing male trees in the orchard, the method may be facilitated by grafting male branches on female trees at sufficient intervals to properly pollinate the female trees, as indicated by box 15 in FIG. 1. Also, in the method a) may be practiced using honey locust trees of a type which can produce about 40% sugar in the fruit pulp. The fooder trees may be produced from clones, or by planting about 120-180 seedling per acre and then thinning them as the grow depending upon location and health and fruit production of the seedlings.

In the method a) is most preferably practiced on old pasture land, hillsides, or other land not well suited for row crops but suitable for fodder tree and pasture growth.

If the fruit from the fodder trees in the orchard does not release when desired, box 16 indicates facilitating release of fruit from the fodder trees by spraying plant hormone—such as gibberellin—on the trees and/or mechanically shaking the trees. Once the animals reach marketable size, as indicated at 17 the vast majority (perhaps all, with the exception of breeding females) of the animals are butchered for meat.

Particularly when the animals are pigs, the method 10 further comprises: b) shortly prior to a) raising the pigs on primarily pasture alone, as indicated by box 18 in FIG. 1. In order to prevent the orchard land from being trampled too much, with possible damage to the trees, in the wettest weather (typically the spring), the pigs are first raised on substantially pasture alone. At this time the pasture plants, including grasses, grow almost twice as quickly as later in the year, and the grass roots hold the soil well, particularly if there is at least about 60% grasses (or plants with like soil holding and hog feed-compatible properties). The pasture land used in b) may have approximately the same composition and types of plants as described above with respect to the orchard pasture base, except that the pasture plants used in the practice of a) should likely be slightly more shade tolerant, even though the orchard tree type and density is not such as to significantly adversely affect the growth of most desirable grasses and legumes.

The method also preferably further comprises c)—as indicated by 19 in FIG. 1—harvesting the pasture base from the fodder tree orchard primarily prior to a) to produce hay, and removing at least the majority of the hay from the orchard for use at a later time and/or place (such as silage fed to sows during the winter time, e.g. using the Swedish Deep Bed System). With about 35 trees per acre, substantially uniformly spaced in a grid, the trees will be located about 36 feet apart. This allows four passes of a conventional eight foot mower bar during harvesting of the pasture plants, making harvesting simple and easy, and insuring no damage to the trees.

Preferably a)-c) are practiced in temperature zones 5-8 (inclusive) from about April to about November.

In the practice of the method, it is most desirable if substantially each pig is fed about 1-2 pounds (one pound for feeder pigs, 2 pounds for sows) per day of grain, and also conventional vitamin and/or mineral supplements, during the practice of a) and b). Typically, a) is practiced with about 15-25 feeder hogs per acre.

Figure 2:
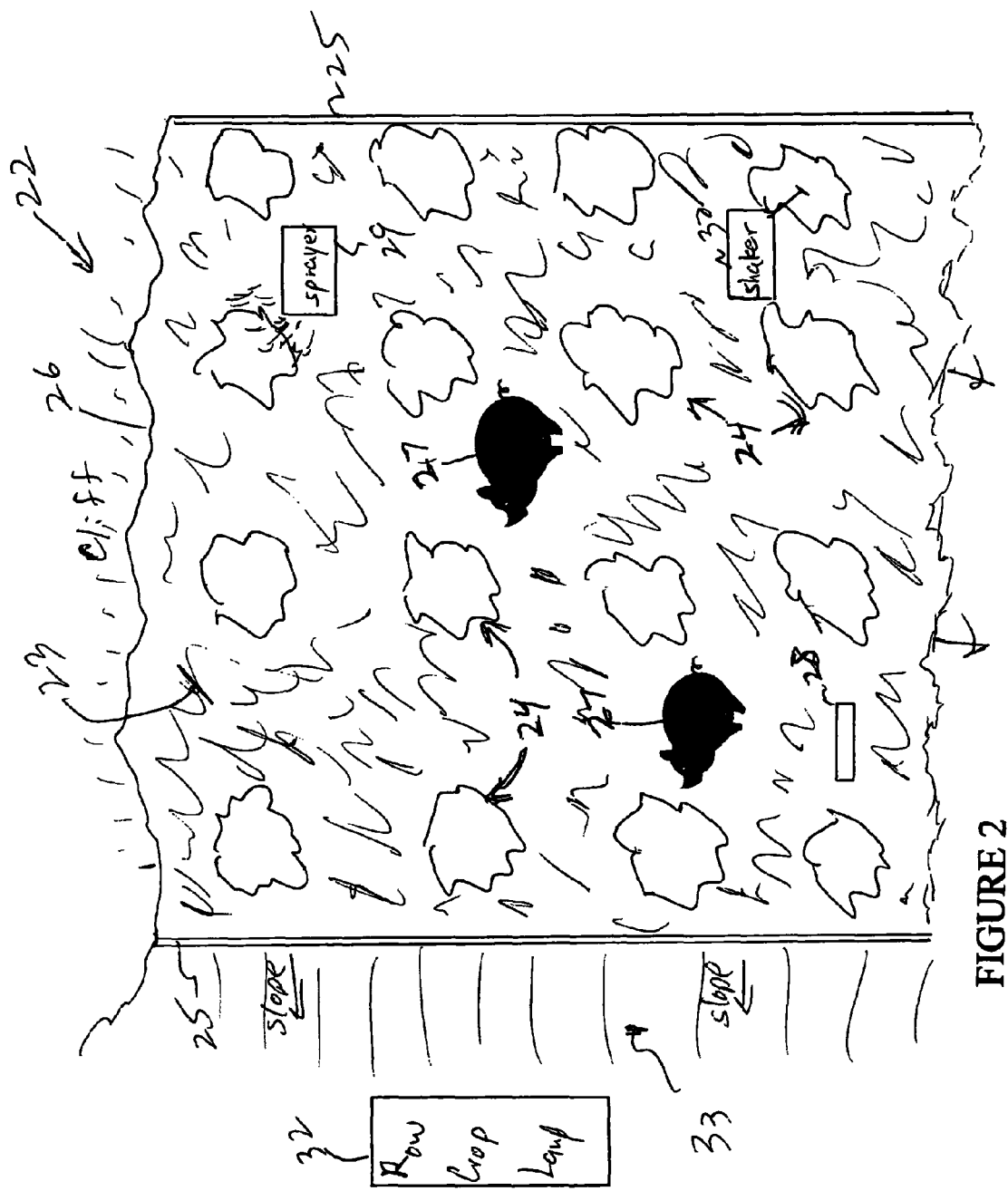
FIG. 2 is a top plan schematic view of an exemplary fodder tree orchard with pasture base according to the invention.

FIG. 2 schematically illustrates a fodder tree orchard according to the invention, shown generally by reference numeral 22. The orchard 22 has a pasture base 23, preferably with the grasses and other plants as described above. The fodder trees 24 are preferably spaced on a grid, as seen in FIG. 2, with about 30-45 mature trees/acre. The orchard 22 is confined, as indicated by electric fence lengths 25, and cliff 26; another fence length defining another edge of the orchard 22 is not seen in FIG. 2, but would be at the "bottom" of the orchard 22 as see in FIG. 2.

While the orchard 22 is confined, the monogastric animals—such as hogs 27—roam free. The spacing between the trees 24 preferably is such that the pasture 23 plants may be harvested during particularly wet seasons (e.g. April—mid June in Zone 5) using a mechanical harvester 28, e.g. a conventional mower. For example if the trees 24 are located about 36 feet apart, this allows four passes of a conventional eight foot mower 28 bar during harvesting of the pasture plants, making harvesting simple and easy, and insuring no damage to the trees 24.

The orchard 22 preferably has a size of at least about one acre, with about 10-20 acres optimum. The orchard 22 is preferably old pasture land, hillsides, or other land not well suited for row crops but suitable for fodder tree and pasture growth. The fodder trees 24 are primarily (or exclusively) selected from honey locust, mulberry, chestnut, persimmon, and combinations thereof. Where the fodder trees 24 comprise primarily dioecious trees, instead of providing male trees in the orchard, male branches are grafted onto female trees at sufficient intervals to properly pollinate the female trees. In order to facilitate release of fruit from the trees 24 they may be sprayed with a mechanized or manual sprayer, as indicated at 29, or mechanically shaken by a shaker 30, or if possible by direct human action.

The orchard 22 of FIG. 2 is substantially immediately above a row crop area 32 (see slope 33 in FIG. 2) so that any excess manure from the orchard 22 will be carried to fertilize the row crop area 32. Preferably the orchard 22 is located in one of temperature zones 5-8 inclusive.

When hogs 27 are raised according to the invention, when butchered the hogs 27 each preferably have a weight of about 250-340 pounds (e.g. about 265 lbs.), and a lean weight of at least about 38%. This is much leaner (e.g. at least about 5% leaner) than hogs typically raised in feed lots, meaning the farmer can get a higher rate per pound, and/or market in a specialized, higher profit, manner.

The invention is to be interpreted as broadly as allowed by the prior art. The numerical values set forth are approximate, and the ranges given specifically include all specific narrower ranges within any broad range.

What is claimed is:

1. A method of raising animals with monogastric digestion, comprising:
   a) feeding the animals with monogastric digestion in a confined and managed fodder tree orchard with pasture base with the animals allowed to roam substantially freely and feed on fodder from the trees and feed on the pasture in the orchard.

2. A method as recited in claim 1 wherein the animals are pigs and the orchard is at least about one acre in area, and further comprising: b) shortly prior to a) raising the pigs on primarily pasture alone.

3. A method as recited in claim 2 wherein b) is practiced on pasture land that comprises about 20-40% swine-compatible legumes and about 80-55% grasses.

4. A method as recited in claim 1 wherein a) is practiced with a pasture base that comprises about 20-40% mongoastric animal-compatible legumes and about 80-55% grasses.

5. A method as recited in claim 4 wherein a) is further practiced so that the legumes are selected from alfalfa, ladino clover, lespedeza clover, and combinations thereof, and the grasses are selected from small grain cereals including barley, oats, and winter wheat, orchard grass, endophyte-free fescue, timothy, brome grass, sorghum sudangrass hybrid, and combinations thereof.

6. A method as recited in claim 4 wherein a) is further practiced by strip seeding the pasture base with brassicas, rape, chicory, Jerusalem artichoke, other raised animal-specific nutritious plants, or combinations thereof.

7. A method as recited in claim 1 wherein a) is further practiced using fodder trees primarily selected from honey locust, mulberry, chestnut, persimmon, and combinations thereof.

8. A method as recited in claim 2 further comprising c) harvesting the pasture base from the fodder tree orchard primarily prior to a) to produce hay, and removing at least the majority of the hay from the orchard for use at a later time and/or place.

9. A method as recited in claim 8 wherein a)-c) are practiced in temperature zones 5-8 inclusive from about April to about November.

10. A method as recited in claim 1 wherein a) is practiced using about 30-45 mature fodder trees per acre of the orchard, and wherein the orchard is at least about one acre in area.

11. A method as recited in claim 1 wherein a) is practiced using primarily dioecious trees in the orchard, and wherein instead of providing male trees in the orchard, grafting male branches on female trees at sufficient intervals to properly pollinate the female trees.

12. A method as recited in claim 1 wherein a) is practiced in old pasture land, hillsides, or other land not well suited for row crops but suitable for fodder tree and pasture growth.

13. A method as recited in claim 1 further comprising butchering the animals for meat after reaching a desired weight by practicing a), and wherein pigs and poultry are provided as the monogastric animals.

14. A method as recited in claim 2 further comprising butchering the pigs after a) when the pigs have reached a weight and lean content at least 5% greater on average than if grown in feed lot confinement, and wherein a) is practiced with about 15-25 hogs per acre.

15. A method as recited in claim 1 further comprising locating the fodder tree orchard substantially immediately above a row crop area so that any excess manure from the orchard will be carried to fertilize the row crop area.

16. A method as recited in claim 7 further comprising facilitating release of fruit from the fodder trees by spraying plant hormone on the trees and/or mechanically shaking the trees.

17. A method of raising pigs, comprising:
a) feeding the pigs in a confined and managed at least about one acre in area fodder tree orchard with pasture base, with the pigs allowed to roam substantially freely and feed on fodder from the trees and feed on the pasture in the orchard; and
wherein a) is practiced in old pasture land, hillsides, or other land not well suited for row crops but suitable for fodder tree and pasture growth.

18. A method as recited in claim 17 further comprising butchering the pigs after a) when the pigs have reached a weight of about 250-340 pounds, and a weight and lean content at least 5% greater on average than if grown in feed lot confinement, and wherein a) is practiced with about 15-25 hogs per acre.

19. A method as recited in claim 17 wherein a) is further practiced using fodder trees primarily selected from honey locust, mulberry, chestnut, persimmon, and combinations thereof, with about 30-45 mature fodder trees per acre.

* * * * *